United States Patent [19]

Schimmel et al.

[11] Patent Number: 4,684,710

[45] Date of Patent: Aug. 4, 1987

[54] HALF-AMIDE REACTION PRODUCTS OF DIOXALATES AND AMINO GROUP CONTAINING MATERIALS

[75] Inventors: Karl F. Schimmel, Verona; Thomas A. Ward, Gibsonia; Jerome A. Seiner, Pittsburgh, all of Pa.

[73] Assignee: PPG Industries, Inc., Pittsburgh, Pa.

[21] Appl. No.: 892,640

[22] Filed: Aug. 4, 1986

[51] Int. Cl.[4] .............................................. C08B 77/04
[52] U.S. Cl. ..................................... 528/26; 525/540; 528/106; 528/183; 528/272; 528/335; 528/341; 528/342; 528/343
[58] Field of Search ................... 525/540; 528/26, 106, 528/183, 272, 335, 341, 342, 343

[56] References Cited

U.S. PATENT DOCUMENTS 4,252,703  2/1981  Patzschke et al. ................. 260/29.2
4,414,250  11/1983  Costanza et al. ................... 427/386
4,477,530  10/1984  Diefenbach et al. ............... 428/413
4,529,467  7/1985  Ward et al. ......................... 156/307

OTHER PUBLICATIONS

Beilsteins Handbuch der Organischen Chemie, Gesamtregister für das Hauptwerk und die Ergänzungswerke I, II, III, und IV, Formelregister für Band 4, p. 148, Springer-Verlag, Berlin, 1984.

*Primary Examiner*—Maurice J. Welsh
*Attorney, Agent, or Firm*—Linda Pingitore

[57] ABSTRACT

An ungelled composition is prepared as the half-amide reaction product of a diester of oxalic acid and a material containing one or more primary and/or secondary amino groups and one or more different functional groups. The ungelled composition is useful as a crosslinking agent for amine group containing materials and as an intermediate in the preparation of resinous compositions for fire protective coatings.

9 Claims, No Drawings

HALF-AMIDE REACTION PRODUCTS OF DIOXALATES AND AMINO GROUP CONTAINING MATERIALS

BACKGROUND OF THE INVENTION

The present invention relates to reaction products of oxalic acid esters and amino group containing materials.

U.S. Pat. No. 4,414,250 to Costanza et al relates to the incorporation of oxalate ester into an amine containing thermoplastic resin composition in order to achieve a rapid crosslinking reaction between the oxalate groups and the amino-hydrogen groups. The composition cures at ambient temperature to a highly crosslinked thermoset coating.

Reaction products of oxalic acid esters and amino group containing materials which do not result in crosslinked films, heretofore, have been unknown.

SUMMARY OF THE INVENTION

In accordance with the present invention there is provided an ungelled composition comprising the half-amide reaction product of a diester of oxalic acid and a material containing one or more primary and/or secondary amino groups and one or more different functional groups.

DETAILED DESCRIPTION OF THE INVENTION

The ungelled composition of the present invention comprises the half-amide reaction product of two principal constituents. The first of these is a diester of oxalic acid which can be represented by the formula shown below:

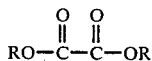

wherein R can be chosen from aliphatic, cycloaliphatic or aromatic substituents. Exemplary of such suitable diesters include diethyl oxalate, dibutyl oxalate, diphenyl oxalate, dibenzyl oxalate and dicyclohexyl oxalate. Preferably, the diester of oxalic acid is selected from diethyl oxalate and dibutyl oxalate.

Another constituent which is utilized in the preparation of the half-amide reaction product is a material containing one or more primary and/or secondary amine groups and one or more additional functional groups. This amino group-containing material can be monomeric or polymeric. Some examples of monomeric materials are 5-hydroxy-3-oxapentylamine commercially available from Texaco under the registered trademark DIGLYCOLAMINE ®; ethanol amine, aminobenzoic acid; aminocyclohexanol; aminocyclohexane carboxylic acid; aminocaprolactone; aminocresol; aminobutanol; aminopropyltriethoxysilane; aminocaprylic acid and aminobutyric acid.

Some examples of polymeric materials include polyamines such as the liquid diamine which is commercially available from Henkel Company under the trademark designation VERSAMINE A-52; polyethylene imines such as those commercially available from Dow Chemical Company under the trademark designation PEI; polyalkyl polyamines such as di(hexamethylene)-triamine; poly(amide-amines) such as VERSAMID 125 which is commercially available from Henkel Company; and phenolic polyamines such as VERSAMINE F-20 which is also commercially available from Henkel Company.

In one preferred embodiment, the monomeric material commercially available under the trademark DIGLYCOLAMINE ® is utilized.

As was stated above, the material containing one or more primary and/or secondary amino groups also contains one or more different functional groups. These functional groups include hydroxyl, carboxyl, thiol, epoxy, alkoxysilane, and tertiary amino. Although not generally referred to as functional groups, easily aminated ester groups such as alpha-keto esters and vinyl unsaturation can also be present on the amino group-containing material. For ease of discussion, easily aminated ester groups and vinyl unsaturation are referred to herein as functional groups. Preferably, the material containing primary and/or secondary amino groups contains hydroxyl functionality as the functional group or groups.

In addition to the materials listed above among the monomeric amino group containing materials, examples of materials containing one or more primary and/or secondary amino groups and one or more different functional groups include amino acids such as alanine; mercaptoethylamine; t-butyl aminoethyl methacrylate; an epoxy containing hydrazide such as that formed from an epoxidized oil and hydrazine, or that formed from a cycloaliphatic epoxy ester such as epoxycyclohexylmethyl epoxycyclohexane and hydrazine.

It should be understood that ungelled compositions which are polymeric in nature can be formed by reacting the half-amide reaction product with a difunctional material having functional groups coreactive with those on the half-amide reaction product, for example, a diisocyanate.

The ungelled composition comprising the half-amide reaction product is generally prepared by combining and heating the reactants at a temperature below about 30° C. Typically an inert solvent such as ethyl alcohol or xylene is utilized although, if desired, the reaction can be performed without the presence of solvent. The completion of the reaction is monitored by gel permeation chromatography and is evidenced by the essentially complete disappearance of low molecular weight starting materials.

The ungelled compositions of the present invention are useful as crosslinking agents for amine group containing materials. Also, the ungelled compositions are useful as intermediates in the preparation of resinous compositions for formulating fire protective compositions. When utilized as an intermediate in the preparation of a further ungelled resinous composition, the half-amide reaction product is typically reacted with a material which is capable of coreacting with the additional functional groups which are present on the amino group containing material. For example, in a preferred embodiment the amino group containing material is hydroxyl functional and the material capable of coreacting with it can be isocyanate functional or it can contain alkoxyalkyl groups.

The following examples are illustrative of the invention and are not intended to limit it to their details.

EXAMPLE I

This Example illustrates the preparation of a half-amide reaction product according to the present invention.

| Charge | Ingredients | Parts by Weight (grams) |
|---|---|---|
| I | diethyl oxalate | 730 |
|  | ethyl alcohol | 230 |
| II | JEFFAMINE T403[1] | 800 |

[1] Commercially available from Texaco.

A suitably equipped reactor vessel was charged with (I) and placed under a nitrogen atmosphere. Charge (II) was then added slowly over a one-hour period while keeping the temperature at about 28° C. The reaction mixture was held at this temperature for 30 minutes and then warmed to 120° C. and the distillate removed. The resultant ungelled product had a total solids content of 94.7 percent as determined at 110° C. for one hour and a Gardner viscosity of Z7—.

EXAMPLE II

This Example illustrates the preparation of a half-amide reaction product according to the present invention and its use as an intermediate in the preparation of an ungelled resinous composition.

| Charge | Ingredients | Parts by Weight (grams) |
|---|---|---|
| I | diethyl oxalate | 988.0 |
| II | DIGLYCOLAMINE ® | 710.5 |
| III | L2291 A[2] | 852.6 |
| IV | EPON 828[3] | 960.2 |

[2] This triisocyanate is commercially available from Mobay Chemical Corporation.
[3] This diglycidyl ether of bisphenol A is commercially available from Shell Chemical Company.

A suitably equipped reactor vessel was charged with (I) and placed under nitrogen atmosphere. Charge (II) was then added over a two-hour period while maintaining the temperature at about 28° C. After the addition was completed, the reaction mixture was held at about 28° C. for a two-hour period. The reaction mixture was sparged for 30 minutes at 120° C. and then cooled to 90° C. Charge (III) was then added over a one-hour period. The reaction was complete with the disappearance of isocyanate as determined by infrared spectroscopy. The reaction mixture was cooled to 45° C. and then Charge (IV) was added. The mixture was then allowed to cool to room temperature. The resultant product had a total solids content of 97.4 percent determined at 110° C. for one hour.

EXAMPLE III

This Example also illustrates the preparation of a half-amide reaction product and its use as an intermediate in the preparation of an ungelled resinous composition.

| Charge | Ingredients | Parts by Weight (grams) |
|---|---|---|
| I | diethyl oxalate | 525.6 |
|  | CYMEL 300[4] | 311.3 |
| II | DIGLYCOLAMINE ® | 378.0 |
| III | para-toluenesulfonic acid | 16.5 |
|  | methanol | 49.5 |

[4] This melamine-formaldehyde condensate is commercially available from American Cyanamid.

A suitably equipped reactor vessel was charged with (I) and placed under nitrogen atmosphere. Charge (II) was added over a one-hour period while maintaining the temperature at 28° C. to 30° C. After the addition was completed, the reaction mixture was held at this temperature for one hour. Charge (III) was then added and the mixture was heated to 135° C. to 140° C. and the distillate removed. The resultant product had a total solids content of 88.2 percent determined at 110° C. for one hour.

EXAMPLE IV

This Example illustrates the preparation of a fire protective intumescent composition utilizing a half-amide reaction product according to the present invention.

|  | Ingredients | Parts by Weight (grams) |
|---|---|---|
| Package 1: | resinous composition of Example II, above | 43.4 |
|  | FYROL CEF[5] | 14.6 |
|  | boric acid | 23.5 |
|  | ammonium polyphosphate | 5.1 |
|  | zinc borate | 4.5 |
|  | melamine | 3.0 |
|  | wollastonite[6] | 14.4 |
| Package 2: | VCX 11-957[7] | 100 |

[5] Tris-(2-chloroethyl)phosphate commercially available from Stauffer Chemical Company.
[6] This fibrous reinforcing filler is commercially available from Nycor Corp. as NYAD D.
[7] This amine curing agent is commercially available from Henkel Company and has an average amine equivalent weight of 167.

The fire protective composition was prepared by mixing together 4 parts by weight of Package 1 and 1 part by weight of Package 2. The composition was applied to a 3 inch ×3 inch ×½inch steel plate having one thermocouple embedded in it such that the top, bottom and sides were uniformly covered with a 3/10 inch thick coating. The plate was allowed to cure for two days at room temperature and then burned in a gas fired furnace according to ASTM E-119 (UL-263). The variable measured was the length of time required for the steel to reach a temperature of 1000° F. (538° C.). The test was concluded when the steel reached this temperature. [The temperature of the steel was measured by the thermocouple. When more than one thermocouple was utilized, the average of all the thermocouples was taken with the proviso that each individual thermocouple cannot exceed a temperature of 1200° F. (649° C.)].

The time required to reach the conclusion of the test was 49:44 (minutes:seconds). The control plate was identical to the coated plate in all respects except that it was not coated with the intumescent position. The uncoated 3 inch ×3 inch ×½inch steel control plate required 12 minutes to reach a temperature of 1000° F. (538° C.).

What is claimed is:

1. An ungelled composition comprising the half-amide reaction product of a diester of oxalic acid and a material containing one or more primary and/or secondary amino groups and one or more different functional groups.

2. An ungelled composition according to claim 1 which is polymeric.

3. The composition of claim 1 wherein the material containing primary and/or secondary amino groups contains at least two primary and/or secondary amino groups.

4. The composition of claim 1 wherein the diester of oxalic acid is selected from diethyl oxalate and dibutyl oxalate.

5. The composition of claim 1 wherein the material containing primary and/or secondary amino groups is monomeric.

6. The composition of claim 1 wherein the material containing primary and/or secondary amino groups is polymeric.

7. The composition of claim 1 wherein the one or more different functional groups are selected from hydroxyl, carboxyl, thiol, epoxy, alkoxysilane, tertiary amino, easily aminated ester, and vinyl unsaturation.

8. The composition of claim 7 wherein the different functional group is hydroxyl.

9. The composition of claim 5 wherein the material containing primary or secondary amino groups is 5-hydroxy-3-oxa-pentylamine.

* * * * *